Jan. 30, 1934. J. J. STAMPEN 1,945,386
TEAT CUP
Filed Aug. 28, 1931
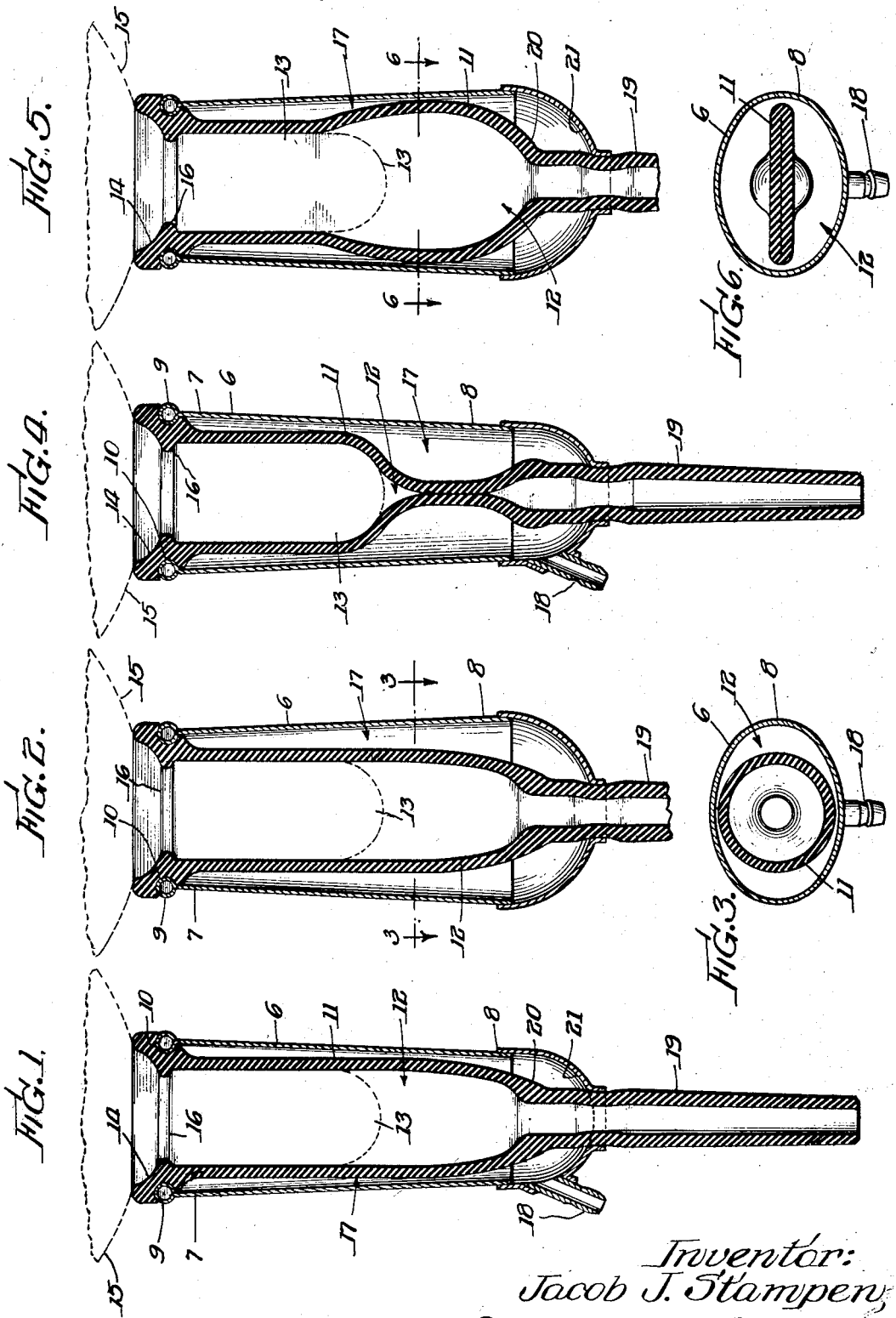
Inventor:
Jacob J. Stampen,
By Cheever, Cox & Moore
attys.

Patented Jan. 30, 1934

1,945,386

UNITED STATES PATENT OFFICE 1,945,386

TEAT CUP

Jacob J. Stampen, Chicago, Ill., assignor to Babson Manufacturing Corporation, Chicago, Ill., a corporation of Illinois Application August 28, 1931. Serial No. 559,897

4 Claims. (Cl. 31—85)

This invention relates to teat cups for milking machines and its primary object is to provide a teat cup of new and improved design for causing the inflation inside of the metal shell to flex inwardly and evenly on opposite sides for the purpose of providing an easy, positive and even action on the teat and to preserve the life of the inflation.

Another object is to provide a teat cup which has an elliptical portion whereby the pulsations will cause the inflation to flex inwardly along the greatest cross sectional dimension or major axis of the cup and prevent total collapse of the inflation.

A still further object of the invention is to provide a new and novel inflation for providing massaging action to the udder during operation of the milking machine and to provide improved means for making an air-tight connection between the inflation and the shell.

The above and numerous other objects and advantages will be apparent throughout the progress of the following specification.

The accompanying drawing illustrates a selected embodiment of the invention and the views therein are as follows:

Fig. 1 is a longitudinal sectional view through the improved teat cup.

Fig. 2 is a similar view at right angles to Fig. 1.

Fig. 3 is a detail sectional view on the line 3—3 of Fig. 2.

Fig. 4 is a view similar to Fig. 1 showing the inflation collapsed during operation of the pulsator.

Fig. 5 is a similar view at right angles to Fig. 4.

Fig. 6 is a detail sectional view on the line 6—6 of Fig. 5.

Referring to the drawing, 6 designates generally a metal teat cup shell having a cylindrical upper portion 7 and a lower elliptical portion 8 which merges with the round portion. The upper part 7 of the shell is provided with an annular bead 9 which engages an annular peripheral groove 10 formed in the upper part of an inflation 11.

The inflation is made of soft flexible material such as rubber and has a relatively large chamber 12 for the reception of the teat 13. The upper end of the inflation is provided with an inclined annular surface 14 which provides a massaging action on the udder 15 during operation of the milking machine. An annular bead 16 is formed just below the inclined portion 14 for providing an impinging action on the upper part of the teat just below the bottom of the udder. The inflation is smaller in diameter than the portion 7 of the shell to provide a space or chamber 17 about the circular inflation so as to permit the air passing through the tube 18 to pass around all sides of the inflation and cause it to collapse evenly. The inflation will attain the position shown in Fig. 6 when air under pressure passes through the tube 18. This tube is preferably arranged on the shell at the elliptical portion and substantially at the center intermediate the major axis of the elliptical portion. Thus, there is no danger of the inflation blocking the tube when the air in the shell passes out due to the pulsating operation. The inflation is circular in cross section and merges with a tube 19 which leads to a milk bucket or other receptacle (not shown) but in which a slight vacuum exists in a manner well known in the art. The bottom 20 of the inflation at the point where the body of the inflation merges with the tube 19 is spaced from the bottom 21 of the shell as clearly shown in the various figures. A pulsator (not shown) is operatively connected to the tube 18 for the purpose of providing pulsations for collapsing the tube at certain intervals. The pulsations cause the inflation 11 to flex or contract inwardly across the major axis of the shell as shown in Figs. 4 and 5. These pulsations cause each side of the inflation to flex or bend inwardly and permit the inflation to assume its normal expanded position shown in Figs. 1 and 2 between pulsations.

By making the upper end of the shell round and its lower end elliptical, the inflation will flex inwardly on opposite sides of the cup across the major axis of the elliptical portion. This flexing or contracting of the inflation will assume the shape shown in Figs. 4 and 5 during the pulsating operation, each side of the inflation flexing inwardly substantially the same amount providing for even intermittent flexing and expansion to cause even and regular suction on the teat. The particular shape of the shell causes the inflation, during the pulsating operation, to flex evenly on both sides. Furthermore, by making the inflation of a less diameter than the shell, air is permitted to pass evenly about the entire inflation. The annular bead 16 and the inclined portion 14 form means for providing a massaging action on the teat and udder and greatly assists in causing the animal to give its milk freely. The particularly shaped inflation in combination with the particularly shaped shell prevents complete and irregular collapsing of the inflation, thereby increasing the life of the inflation considerably. In actual practice it has been found that the inflation herein set forth will last at least three times as long as conventional inflations. The manner in which the inflation engages the shell prevents any air from entering between the shell and the inflation and makes it possible for the particular construction shown at the inner upper surface of the inflation.

A teat cup constructed in accordance with the present invention causes even and regular flexing or contracting of the inflation preventing the inflation from turning or bending, causes even suction on the teat, and prolongs the life of the inflation.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In combination, a teat cup comprising a metal shell having an upper cylindrical portion and a lower elliptical portion integral with the upper cylindrical portion and merging therewith, the cross sectional area of the elliptical portion being substantially the same as the cross sectional area of the cylindrical portion, and an inflation of uniform thickness arranged inside of the cup, the external diameter of the inflation being less than the internal diameter of the elliptical portion across its minor axis.

2. In combination, a teat cup comprising a metal shell having an upper cylindrical portion and a lower elliptical portion integral with the upper cylindrical portion and merging therewith, the cross sectional area of the elliptical portion being substantially the same as the cross sectional area of the cylindrical portion, an inflation arranged inside of the cup, the diameter of the inflation being less than the diameter of the elliptical portion across its minor axis, said shell having an opening in its bottom, and a milk tube integral with the inflation and extending through the opening, said inflation moving inwardly in planes from the side walls of the shell toward the longitudinal transverse axial center line thereof during the milking operation.

3. In combination, a teat cup comprising a metal shell having an upper cylindrical portion and a lower elliptical portion integral with the upper cylindrical portion and merging therewith, the cross sectional area of the elliptical portion being substantially the same as the cross sectional area of the cylindrical portion, an inflation arranged inside of the cup, the external diameter of the inflation being less than the internal diameter of the elliptical portion across its minor axis, and a downwardly inclined pulsating tube at the lower end of said shell and located at the major axis of the elliptical portion whereby the inflation will contract inwardly from the minor axis of the shell.

4. In combination, a teat cup comprising a metal shell having an upper cylindrical portion and a lower elliptical portion integral with the upper cylindrical portion, the cross sectional area of the elliptical portion being substantially the same as the cross sectional area of the cylindrical portion, an inflation of uniform thickness arranged inside of the cup, the diameter of the inflation being less than the diameter of the elliptical portion across its minor axis, said shell having an opening in its bottom, a milk tube integral with the inflation and extending through the opening, and a pulsating tube at the lower end of said shell and located substantially in the center thereof at the major axis of the elliptical portion whereby the inflation will be caused to contract inwardly in planes toward each other during the milking operation.

JACOB J. STAMPEN.